United States Patent [19]

Nishimura et al.

[11] Patent Number: 5,021,649
[45] Date of Patent: Jun. 4, 1991

[54] RELIEF DIFFRACTION GRATING ENCODER

[75] Inventors: Tetsuharu Nishimura, Kawasaki; Koh Ishizuka, Urawa; Satoshi Ishii; Masaaki Tsukiji, both of Tokyo, all of Japan

[73] Assignee: Canon Kabushiki Kaisha, Tokyo, Japan

[21] Appl. No.: 496,259

[22] Filed: Mar. 20, 1990

[30] Foreign Application Priority Data

Mar. 28, 1989 [JP] Japan .................................. 1-77058
Jun. 16, 1989 [JP] Japan .................................. 1-54168

[51] Int. Cl.⁵ .............................................. G01D 5/34
[52] U.S. Cl. ........................... 250/231.16; 250/237 G
[58] Field of Search ................. 250/237 G, 231.16; 356/356

[56] References Cited

U.S. PATENT DOCUMENTS

| | | | |
|---|---|---|---|
| 4,286,871 | 9/1981 | Erickson | 250/237 G |
| 4,459,026 | 7/1984 | Pekelsky | 356/356 |
| 4,656,347 | 4/1987 | Une et al. | 250/237 G |
| 4,664,524 | 5/1987 | Hattori et al. | 250/237 G |
| 4,705,996 | 11/1987 | Harshberger, Jr. et al. | 250/237 G |
| 4,746,792 | 5/1988 | Dil | 250/237 G |
| 4,785,181 | 11/1988 | Kimizuka et al. | 250/237 G |
| 4,885,734 | 12/1989 | Yuzo | 250/237 G |
| 4,929,822 | 5/1990 | Nakamura et al. | 250/231.16 |

Primary Examiner—David C. Nelms
Assistant Examiner—K. Shami
Attorney, Agent, or Firm—Fitzpatrick, Cella, Harper & Scinto

[57] ABSTRACT

An encoder of this invention radiates a light beam onto an optical scale, in which a reflection film is formed on a surface of a relief type diffraction grating formed on one surface of a light-transmission substrate, from a surface opposite to the formation surface of the diffraction grating, and detects a change in intensity of interference light caused by diffracted light produced by the diffraction grating, thereby measuring a displacement of the optical scale.

12 Claims, 4 Drawing Sheets

INCIDENT LIGHT

RELIEF DIFFRACTION GRATING ENCODER

BACKGROUND OF THE INVENTION:

1. Field of the Invention

The present invention relates to an encoder employing a method of measuring a displacement of an optical scale in which a relief type diffraction grating is formed on a light-transmission substrate by utilizing diffracted light produced by the diffraction grating.

2. Related Background Art

A device disclosed in, e.g., Japanese Utility Model Publication No. 61-39289 is known as a conventional encoder such as a linear encoder, a rotary encoder, or the like. In this device, as shown in FIG. 8, grooves are cyclically formed on a transparent glass substrate to form a relief type diffraction grating. A metal reflection film of Au or Al is deposited on the cyclic groove surfaces to constitute an optical scale. The optical scale is illuminated from a position above the relief type diffraction grating, and high-order diffracted light components produced by the relief type diffraction grating are caused to interfere with each other, thereby forming interference fringes. A change in intensity of the interference fringes is detected and is photoelectrically converted to obtain a sinusoidal signal. A displacement of the optical scale is measured based on the sinusoidal-wave signal.

The relief type diffraction grating described above is very effective since the height of the groove can be appropriately selected to weaken the intensity of 0th-order reflected/diffracted light (regularly reflected light) and to enhance the intensity of high-order reflected/diffracted light used in measurement.

As shown in FIG. 8, however, when a reflection film 3 is deposited on the groove surfaces of the relief type diffraction grating, the deposited film has a nonuniform thickness in a strict sense, and the grooves have nonuniform shapes and depths, accordingly. As a result, the intensity of diffracted light is varied, and it is difficult to perform high-precision measurement.

SUMMARY OF THE INVENTION:

It is an object of the present invention to provide an encoder which can perform high-precision measurement without being influenced by a film thickness condition of a reflection film formed on a diffraction grating.

It is another object of the present invention to provide a low-cost encoder which allows easy formation of a reflection film.

It is still another object of the present invention to provide a high-precision driving system using the encoder.

DESCRIPTION OF THE PREFERRED EMBODIMENTS:

An embodiment of an encoder according to the present invention will be described in detail below with reference to the accompanying drawings.

Figure 1A:
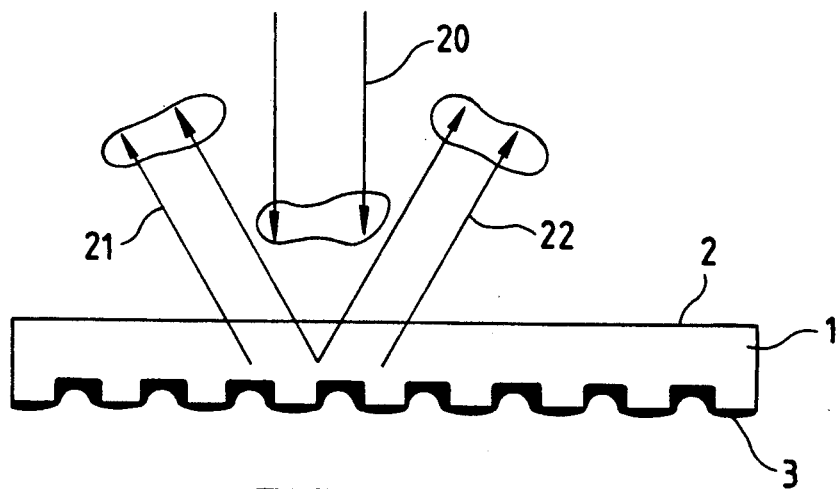
FIGS. 1A, 1B, and 1C are schematic views showing different relief type diffraction gratings used in an encoder according to the present invention.
Figure 1B:
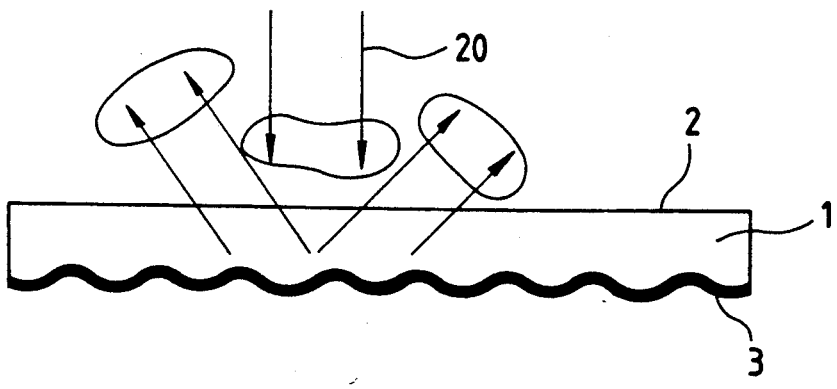
Figure 1C:
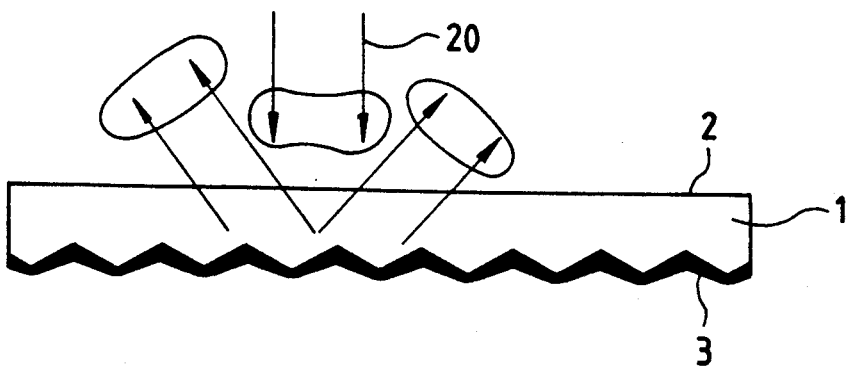

FIGS. 1A to 1C are schematic views for explaining some different relief type diffraction gratings used in an encoder of the present invention. FIG. 1A shows an optical scale in which a relief type diffraction grating whose grooves define a rectangular-wave like sectional shape is formed, FIG. 1B shows an optical scale in which a relief type diffraction grating whose grooves define a sinusoidal-wave like sectional shape is formed, and FIG. 1C shows an optical scale in which a relief type diffraction grating whose grooves define a triangular-wave like sectional shape.

In each of FIGS. 1A to 1C, the reference numeral 1 denotes a transparent substrate which employs a light-transmission material such as glass or a transparent resin On a single side (surface) of the substrate, a diffraction grating is formed. The numeral 2 denotes a light-incident surface of the transparent substrate 1 and the numeral 20 denotes an incident light beam. The numeral 21 denotes a —1st-order diffracted light component and the numeral 22 denotes a +1st-order diffracted light component. In each optical scale, a reflection film 3 for enhancing an intensity of reflected/diffracted light is deposited on the groove surfaces of the relief type diffraction grating.

The characteristic feature of the present invention is that a light beam is incident on the surface of the reflection film 3 not from a substrate surface side o which the diffraction grating is formed but from a substrate surface side opposite to the surface on which the diffraction grating is formed. The light-incident surface 2 of the transparent substrate 1 is subjected to anti-reflection treatment and transparency enhancing treatment with respect to incident light. Thus, the incident light beam 20 reaches an interface between the grooves of the diffraction grating on the transparent substrate 1 and the reflection film 3 without being attenuated, and is reflected by the reflection film, thus producing the reflected/diffracted light components 21 and 22.

With this structure, diffracted light in a predetermined light amount can be produced regardless of the thickness of the reflection film. Therefore, even if the reflection film has a nonuniform thickness due to a deposition process adopted, a light amount of produced diffracted light can be constant without being influenced by the nonuniform thickness. Since the deposition process of the reflection film does not require strict precision, an encoder can be manufactured at low cost.

Figure 2:
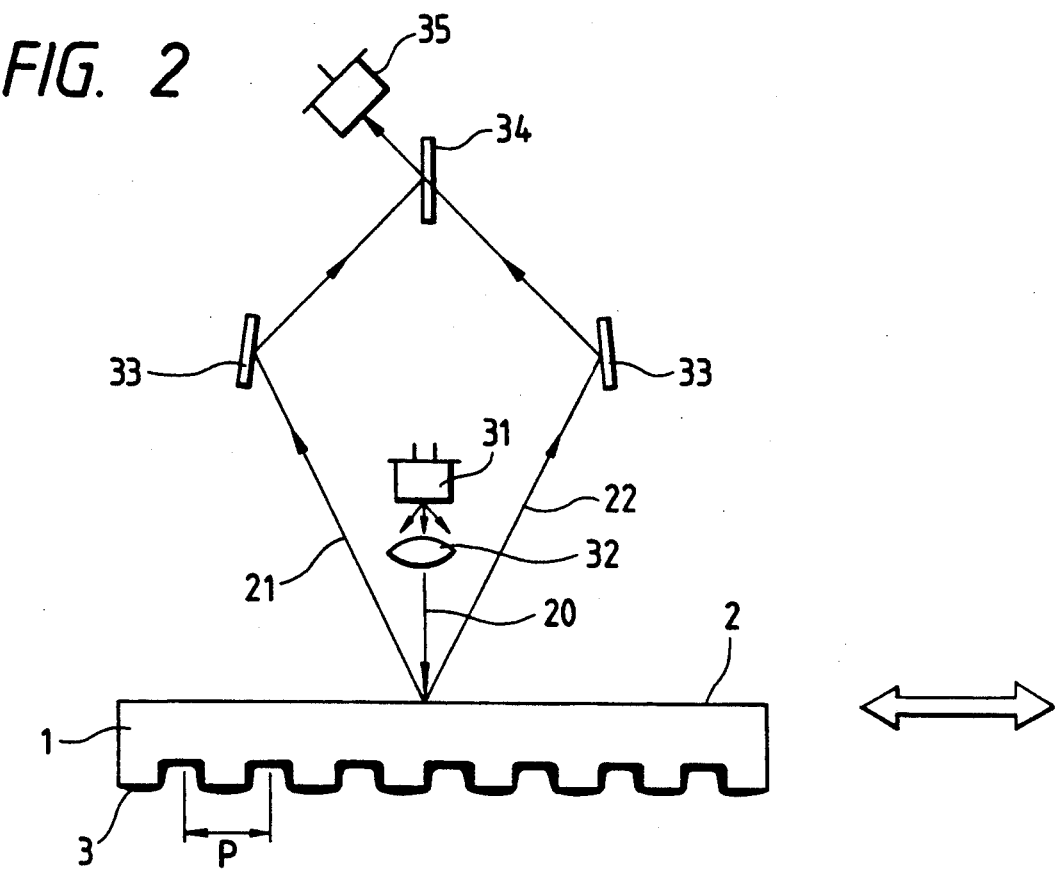
FIG. 2 is a schematic view showing an arrangement of an embodiment of an encoder according to the present invention.

FIG. 2 is a schematic view showing an embodiment of an encoder using an optical scale in which the rectangular-wave like relief type diffraction grating (FIG. 1A) is formed. The optical scale is applied to a so-called optical linear encoder which reads a linear displacement of the optical scale in a direction indicated by an arrow shown in FIG. 2. Note that the diffraction gratings shown in FIGS. 1B and 1C may be employed, as a matter of course.

In FIG. 2, a relief type diffraction grating in which rectangular-wave like cyclic grooves are formed is formed on one substrate surface of the transparent substrate 1 of the optical scale shown in FIG. 1A, and a metal reflection film of, e.g., Au, Al, Cu, Ag, Cr, or the like is deposited on the groove surfaces. An anti-reflection film (not shown) is formed on an incident surface opposite to the substrate surface on which the relief diffraction grating is formed.

In FIG. 2, the reference numeral 31 denotes a multi-mode semiconductor laser 31 for emitting a coherent light beam; 32, a collimator lens; 33, a reflection mirror; 34, a half-mirror; and 35, a light-receiving element. Since the semiconductor laser 31 is of a multi-mode type, a measurement error caused by the influence of a change in wavelength due to a temperature drift can be minimized. Of course, any other light sources which emit a coherent light beam may be employed.

In this structure, a light beam emitted from the semiconductor laser 31 is converted to a substantially collimated light beam by the collimator lens 32, becomes incident on the incident surface 2, and reaches the surface of the diffraction grating. If a light beam is radiated from a direction perpendicular to the diffraction grating formation surface, primary (1st-order) diffracted light components are produced in directions of angles $\pm \theta$ given by the following equation:

$$\theta = \sin^{-1}(\lambda/p) \qquad (1)$$

($\lambda$: wavelength of the laser 31, p: pitch of the diffraction grating)

The produced $\pm$1st-order diffracted light components 21 and 22 are reflected by the reflection mirror 33, and are synthesized to obtain interference light through the half-mirror 34. The interference light is incident on the light-receiving element 35, thus detecting a change in intensity of the interference light.

When the optical scale is moved by a distance x in a direction of an arrow in FIG. 2, the phase of the +1st-order diffracted light component 22 is changed by $2\pi x/p$, and the phase of the −1st-order diffracted light component 21 is changed by $-2\pi x/p$. As a result, the light-receiving element 35 generates an output signal I(x) given by:

$$\begin{aligned} I(x) &= |\exp\{i(\omega t + 2\pi x/p)\} + \exp\{i(\omega t - 2\pi x/p)\}|^2 \\ &= 2\{1 - \cos(4\pi x/p)\} \end{aligned}$$

Therefore, the output signal from the light-receiving element 35 is a sinusoidal-wave signal having x=p/2 as one cycle. If the pitch p of the diffraction grating is 1.6 μm, a 0.8-μm cycle sinusoidal-wave signal can be obtained. In this manner, the moving amount of the optical scale can be measured based on the output signal from the light-receiving element 35. When the optical scale is mounted on an object to be measured (not shown), e.g., a movable stage, the moving amount of this stage can be measured with high precision at a resolution of 1 μm or less.

Figure 3:
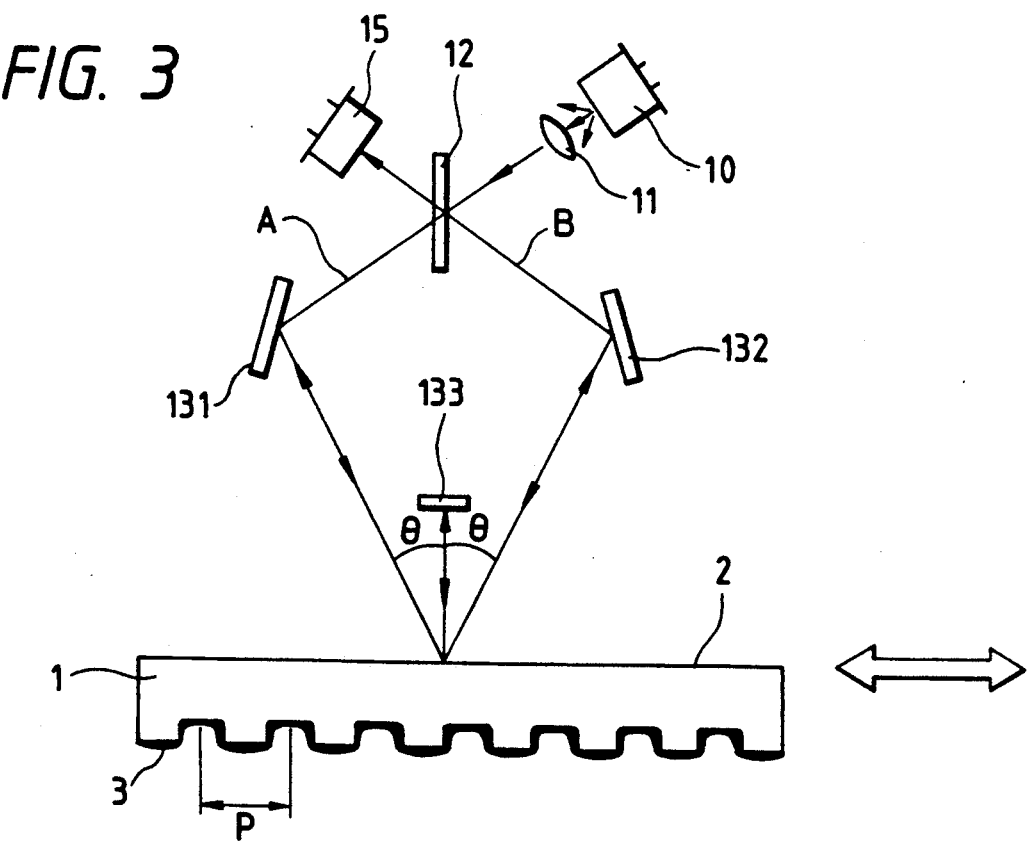
FIG. 3 is a schematic view showing another arrangement of the encoder.

FIG. 3 shows an arrangement of an encoder different from that shown in FIG. 2. The same reference numerals as in FIG. 3 denote the same parts as in FIG. 2.

In FIG. 3, the reference numeral 10 denotes a multi-mode semiconductor laser; 11, a collimator lens; 12, a beam splitter; 131 and 132, reflection mirrors; and 133, a reflection optical system having a mirror surface. These components constitute a cat's eye optical system having substantially the same light incident and exit directions. The encoder also includes a light-receiving element 15.

A light beam emitted from the semiconductor laser 10 is converted to a collimated light beam by the collimator lens 11. The collimated light beam is split into a transmission light beam A and a reflection light beam B by the beam splitter 12. The transmission light beam A and the reflection light beam B are respectively reflected by the reflection mirrors 131 and 132 arranged in their optical paths, and are incident on the same portion of the optical scale at the same angle. If an incident angle $\theta$ with respect to the normal to the diffraction grating (an angle defined by the incident direction and the normal to the surface of the substrate 1) is given by equation (2), a −1st-order diffracted light component produced by reflecting and diffracting the light beam A and a +1st-order diffracted light component produced by reflecting and diffracting the light beam B emerge in a direction perpendicular to the substrate surface (in the direction of the normal).

$$\theta = \sin^{-1}(\lambda/p) \qquad (2)$$

where $\lambda$ is the wavelength of the semiconductor laser 10, and p is the pitch of the relief type diffraction grating (alignment cycle of grooves). The $\pm$1st-order reflected/diffracted light components are reflected in the same direction as the incident direction by the reflection mirror 133, and are reincident on the same position on the optical scale. Upon this reincidence, the +1st-order diffracted light component is subjected to +1st-order diffraction again to be converted to a +1st-order rediffracted light component. The +1st-order rediffracted light component is deflected toward the optical path of the light beam B (original optical path). Meanwhile, the −1st-order diffracted light component is subjected to −1st-order diffraction again to be converted to a −1st-order rediffracted light component. The −1st-order rediffracted light component is deflected toward the optical path of the light beam A (original optical path).

The light beams A and B which have been respectively subjected to $\pm$1st-order diffraction twice are synthesized through the beam splitter 12 to interfere with each other, thus forming interference light. A change in intensity of the interference light is detected by the light-receiving element 15. The phases of the $\pm$1st-order diffracted light components are changed by $\pm 2\pi$ when the diffraction grating is moved by one pitch. Since the interference light of the rediffracted light components which have been respectively subjected to $\pm$1st-order diffraction twice is incident on the light-receiving element 15, four sinusoidal-wave signals are obtained from the light-receiving element 15 when the diffraction grating is moved by one pitch. For example, when the pitch p of the diffraction grating is 1.6 μm, 0.4-μm cycle sinusoidal-wave signals are obtained from the light-receiving element 15. In this manner, when light is incident twice on the diffraction grating, a resolution twice that of the embodiment shown in FIG. 2 ca be realized.

The relationship between the shape of the diffraction grating and diffraction efficiency will be examined in detail below with reference to the rectangular-wave like relief type diffraction grating shown in FIG. 1A.

Figure 4:
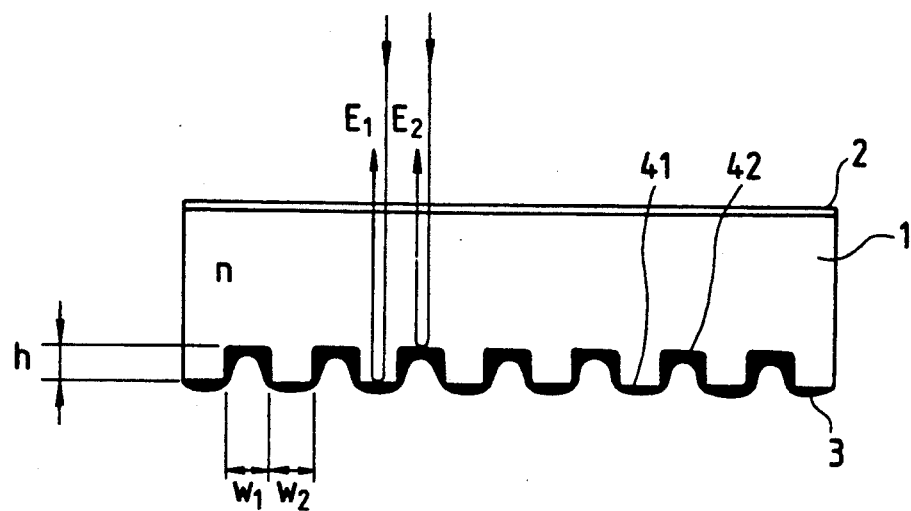
FIG. 4 is a detailed view of an optical scale on which a relief type diffraction grating is formed.

In FIG. 4, if the refractive index of the transparent substrate 1 is represented by n, the depth of the rectangular-wave like diffraction grating grooves is represented by h, and the wavelength of an incident light beam is represented by λ, a light beam $E_1$ reflected by a bottom portion 41 of the groove and a light beam $E_2$ reflected by a top portion 42 of the groove are respectively expressed by equations (3) and (4):

$$E_1 = a \times \exp[i\{\Omega t + 2\pi/\lambda(L+2nh)\}] \quad (3)$$

$$E_2 = a \times \exp[i(\Omega t + 2\pi L/\lambda)] \quad (4)$$

where a is the amplitude of the incident light beam, Ω is the angular frequency of the incident light beam, and L is the optical path length excluding a portion of the diffraction grating (an optical path length extending from the light source to the groove top portion 42). An intensity $I_0(h)$ of regularly reflected light, i.e., 0th-order reflected/diffracted light is given by:

$$I_0(h) = |E_1 + E_2|^2 \quad (5)$$
$$= 2a^2\{1 + \cos(4n\pi h/\lambda)\}$$

When equation (5) is normalized by $I_0(0) = 4a^2$, it can be rewritten as:

$$I_0(h) = \{1 + \cos(4n\pi h/\lambda)\}/2 \quad (6)$$

If the duty (a ratio of groove lengths of the groove bottom and top portions 41 and 42 along the groove aligning direction) of the relief type diffraction grating is 50%, i.e., $W_1 = W_2$ in FIG. 4, since most of high-order diffracted light components can be regarded as ±1st-order diffracted light components, intensities $I_1(h)$ of the ±1st-order diffracted light components can be given by:

$$I_1(h) = \{1 - I_0(h)\}/2 \quad (7)$$
$$= \{1 - \cos(4n\pi h/\lambda)\}/4$$

Figure 5:
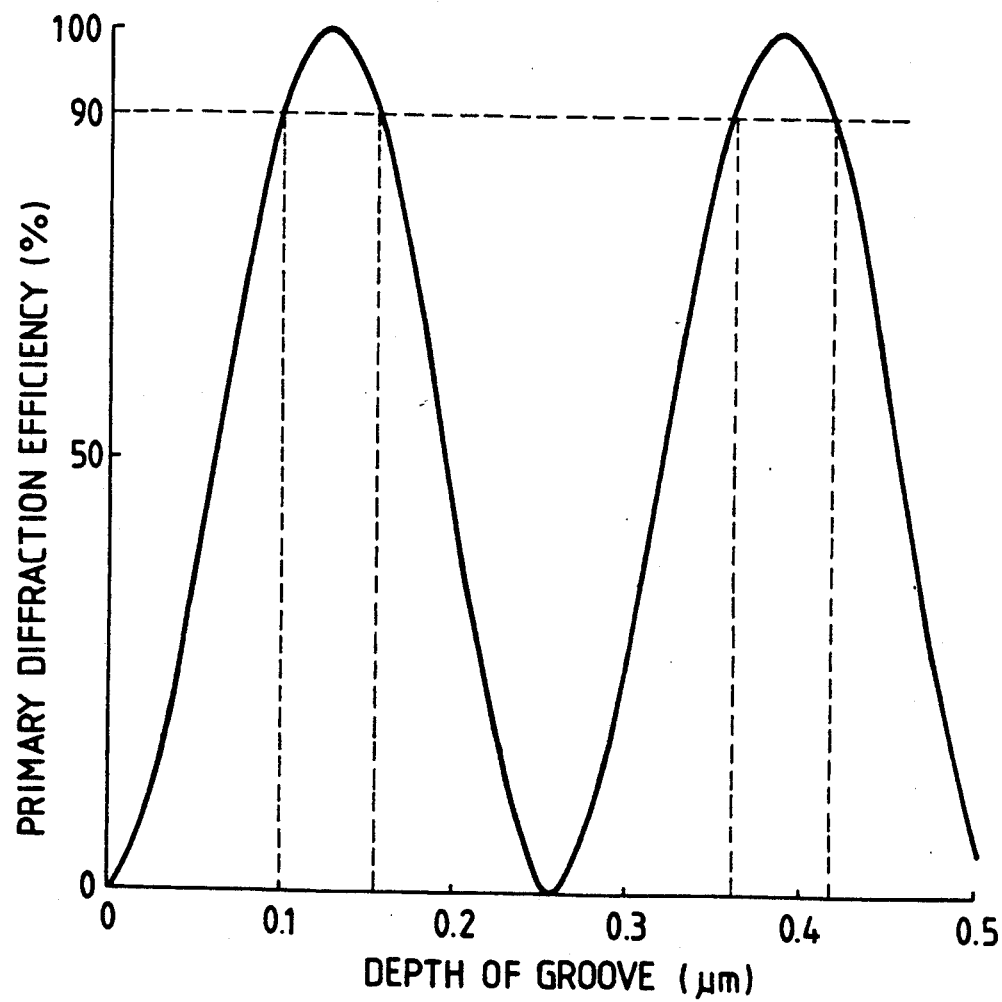
FIG. 5 is a graph showing primary diffraction efficiency (diffraction efficiency of 1st-order diffracted light component) as a function of a depth h of a groove.

FIG. 5 exemplifies primary (1st-order) diffraction efficiency for the depth h of the groove when n = 1.5 and λ = 0.78 μm.

In an encoder which forms interference light by ±1st-order diffracted light components, a condition for maximizing an intensity of ±1st-order diffracted light (a total light amount of ±1st-order diffracted light components) and suppressing an intensity variation of the relief type diffraction grating within 10% is that the depth h of the groove falls within the ranges of 0.10 μm to 0.16 μm, 0.36 μm to 0.42 μm, . . . , and the like in the case of FIG. 5. The condition for suppressing the intensity variation of the 1st-order diffracted light within 10% can be expressed by relation (8) based on equation (7):

$$m + \cos^{-1}(-0.8)/2\pi \leq 2nh/\lambda \leq (m+1)$$
$$-\cos^{-1}(-0.8)/2\pi \, (m=0, 1, 2, 3) \quad (8)$$

In relation (8), since $\cos^{-1}(-0.8) = 2.498$ rad, the following relation (9) can be obtained as the condition for the depth h of the groove for suppressing the intensity variation of diffracted light:

$$(\lambda/n) \times (m/2 + 0.199) \leq h \leq (\lambda/n) \times \{(m+1)/2 - 0.199\} \quad (9)$$

When the depth h of the groove is determined as in relation (9), the intensity variation of diffracted light can be minimized, and a stable output signal can be obtained from the light-receiving element.

In this embodiment, λ = 0.78 μm, n = 1.5, and h = 0.13 μm so that the depth h of the groove of the relief type diffraction grating satisfies relation (9). Thus, displacement measurement can be performed with high precision.

Figure 6:
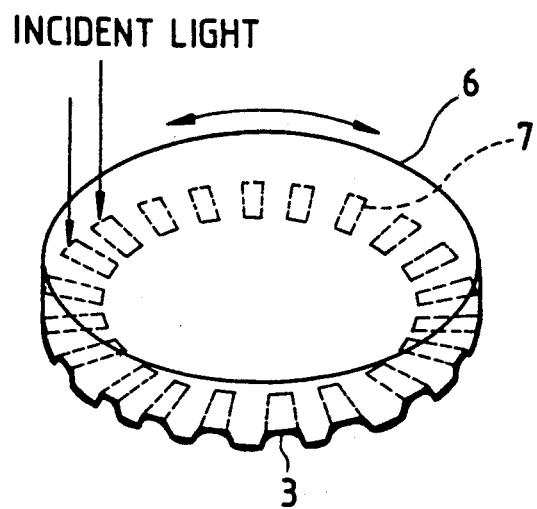
FIG. 6 is a schematic view showing an embodiment in which the present invention is applied to a rotary encoder.

The embodiments in which the present invention is applied to a so-called linear encoder have been described. The present invention can also be applied to a rotary encoder, as shown in FIG. 6. In FIG. 6, a light-transmission substrate 7 is obtained by working glass or a resin into a disk-like shape. A relief type diffraction grating in which cyclic grooves are formed at an equiangular pitch, as shown in FIG. 1A, is formed on one surface of the substrate. Of course, diffraction gratings as shown in FIGS. 1B and 1C may be used. A reflection film is deposited on the diffraction grating surface. An optical system for detecting diffracted light obtained by radiating a light beam onto the diffraction grating has the same arrangement as shown in FIG. 2 or 3. A light beam is incident from a surface opposite to the diffraction grating formation surface of the substrate 7 like in the above embodiment, so that rotational angle measurement can be performed without being influenced by the film thickness of the reflection film 3.

In the embodiments described above, a device for measuring a moving amount or rotational amount (rotational angle) of an optical scale has been exemplified. However, the present invention can also be applied to a device for measuring a moving speed or a rotational speed of an optical scale.

If an encoder adopts diffracted light of an order higher than ±1st-order diffracted light components, e.g., ±2nd-order diffracted light components, a measurement resolution can be further improved.

An encoder may have another arrangement. That is, only diffracted light components of a predetermined order may be extracted from a relief type diffraction grating, and the extracted diffracted light components may be synthesized with another reference light to form interference light. Thus, devices of various other types can be obtained within the spirit and scope of the invention.

Figure 7:
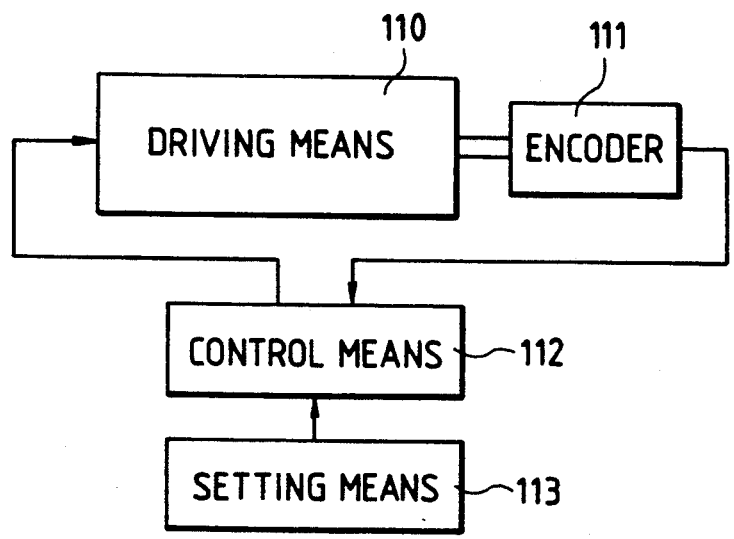
FIG. 7 is a diagram showing an arrangement of a driving system using the encoder.
Figure 8:
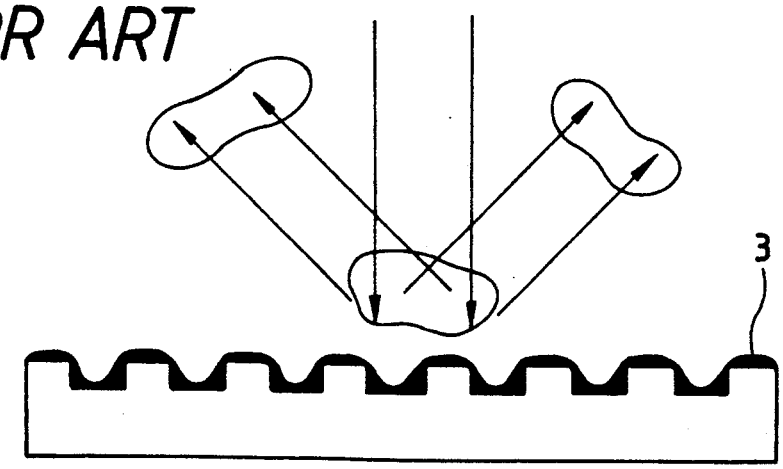
FIG. 8 is a schematic view for explaining a conventional encoder.

FIG. 7 is a diagram showing a driving system using the encoder as an application example of use of the encoder. An encoder 111 is connected to a driving output unit of a driving means 110 having a driving source such as an internal combustion engine or a movable unit of an object to be driven, and detects a driving state such as a rotational amount, a rotational speed, a moving amount, a moving speed, or the like. The detection output of the encoder 111 is fed back to a control means 112. The control means 112 supplies a driving signal to the driving means 110 to achieve a state set by a setting means 113. With this feedback system, a driving state set by the setting means 113 can be maintained without being influenced by a disturbance. The driving system can be widely applied to working machines, manufacturing machines, measurement devices, recording devices, and various other general devices having driving means.

We claim:

1. An encoder comprising:
   a light-transmission substrate;
   a relief type diffraction grating formed on one surface of said light-transmission substrate;
   a refection film formed on said diffraction grating;
   means for radiating a light beam onto said diffraction grating from the other surface of said light-transmission substrate; and
   means for detecting interference light formed by diffracted light produced by said diffraction grating upon radiation, and obtaining relative displacement information of said diffraction grating,
   wherein when a refractive index of said light-transmission substrate is represented by n, a wavelength of the radiated light beam is represented by $\lambda$, and m is an integer ($m \geq 0$), a depth h of a groove of said relief diffraction grating satisfies the following relation:

$(\lambda/n) \times (m/2 + 0.199) \leq h \leq (\lambda/n) \times \{(m+1)/2 - 0.199[)]\}$.

2. An encoder according to claim 1, wherein said reflection film comprises a metal reflection film.

3. An encoder according to claim 1, wherein an anti-reflection film is formed on the surface of said light-transmission substrate on which the light beam is incident.

4. An encoder according to claim 1, further comprising a light source for generating a coherent light beam.

5. An encoder according to claim 4, wherein said light source comprises a semiconductor laser.

6. An encoder according to claim 5, wherein said semiconductor laser comprises a multi-mode semiconductor laser.

7. An encoder according to claim 1, wherein said encoder comprises a linear encoder, and said diffraction grating is formed along a moving direction of a movable object.

8. An encoder according to claim 1, wherein said encoder comprises a rotary encoder, and said diffraction grating is formed along a rotational direction of a rotatable object.

9. A driving system including an encoder, comprising:
   driving means including a driving source;
   an encoder for detecting a driving state of said driving means; and
   control means for controlling said driving means on the basis of an output from said encoder;
   said encoder having:
   a light-transmission substrate connected to a driving output unit of said driving means;
   a relief type diffraction grating formed on one surface of said light-transmission substrate;
   a reflection film formed on said diffraction grating;
   means for radiating a light beam onto said diffraction grating from the other surface of said light-transmission substrate; and
   means for detecting interference light formed by diffracted light produced by said diffraction grating upon radiation, and obtaining relative displacement information of said diffraction grating,
   wherein when a refractive index of said light-transmission substrate is represented by n, a wavelength of the radiated light beam is represented by $\lambda$, and m is an integer ($m \geq 0$), a depth h of a groove of said relief diffraction grating satisfies the following relation:

$(\lambda/n) \times (m/2 + 0.199) \leq h \leq (\lambda/n) \times \{(m+1)/2 - 0.199\}$.

10. A system according to claim 9, further comprising setting means for setting a driving state of said driving means, wherein said control means controls said driving means to obtain the driving state set by said setting means.

11. An encoder according to claim 1, wherein said relief type diffraction grating has a substantially rectangular wave shape.

12. An encoder according to claim 9, wherein said relief type diffraction grating has a substantially rectangular wave shape.

* * * * *

UNITED STATES PATENT AND TRADEMARK OFFICE
CERTIFICATE OF CORRECTION

PATENT NO. : 5,021,649

DATED : June 4, 1991

INVENTOR(S) : TETSUHARU NISHIMURA ET AL.

It is certified that error appears in the above-identified patent and that said Letters Patent is hereby corrected as shown below:

ON THE TITLE PAGE,

AT [30] FOREIGN APPLICATION PRIORITY DATA

"Jun. 16, 1989 [JP] Japan.......1-54168" should read --Jun. 16, 1989 [JP] Japan.......1-154168--.

COLUMN 1

Line 4, "INVENTION:" should read --INVENTION--.
Line 44, "INVENTION:" should read --INVENTION--.

COLUMN 2

Line 13, "EMBODIMENTS:" should read --EMBODIMENTS--.
Line 30, "resin" should read --resin.--.
Line 43, "o" should read --on--.

COLUMN 4

Line 68, "ca" should read --can--.

COLUMN 5

Line 14, "$E_1 = a \times \exp[i\{\Omega t + 2\pi/\lambda(L+2nh)\}]$  (3)" should read
--$E_1 = a \times \exp[i\{\omega t + 2\pi/\lambda(L+2nh)\}]$  (3)"
Line 16, "$E_2 = a \times \exp[i(\Omega t + 2\pi L/\lambda)]$  (4)" should read
--$E_2 = a \times \exp[i(\omega t + 2\pi L/\lambda)]$  (4)--.
Line 18, "$\Omega$" should read --$\omega$--.

UNITED STATES PATENT AND TRADEMARK OFFICE
CERTIFICATE OF CORRECTION

PATENT NO. : 5,021,649

DATED : June 4, 1991

INVENTOR(S) : TETSUHARU NISHIMURA ET AL.

It is certified that error appears in the above-identified patent and that said Letters Patent is hereby corrected as shown below:

COLUMN 6

Line 4, "$(\lambda/n) \times (m/2+0.199) \leq h \leq (\lambda/n) \times \{(m+1)/2-0.199) \quad (9)$" should read
--$(\lambda/n) \times (m/2+0.199) \leq h \leq (\lambda/n) \times \{(m+1)/2-0.199\} \quad (9)$--.

COLUMN 7

Line 8, "refection film" should read --reflection film--.
Line 23, "$\{(m+1)/2-0.199[)]\}$." should read
--$\{(m+1)/2-0.199\}$.--.

Signed and Sealed this

Second Day of February, 1993

Attest:

STEPHEN G. KUNIN

Attesting Officer     Acting Commissioner of Patents and Trademarks